United States Patent [19]

Schmidt

[11] 3,950,606

[45] Apr. 13, 1976

[54] APPARATUS AND METHOD FOR COOLING A SUPERCONDUCTING CABLE

[75] Inventor: Fritz Schmidt, Erlangen, Germany

[73] Assignee: Siemens Aktiengesellschaft, Munich, Germany

[22] Filed: Oct. 10, 1974

[21] Appl. No.: 513,746

[30] Foreign Application Priority Data

Oct. 24, 1973  Germany............................ 2353336

[52] U.S. Cl............ 174/15 S; 174/11 R; 174/15 BH
[51] Int. Cl.²........................................... H01B 12/00
[58] Field of Search .... 174/11 R, 15 R, 15 C, 16 B, 174/DIG. 6, 28, 15 BH, 16 BH

[56] References Cited
UNITED STATES PATENTS

| | | | |
|---|---|---|---|
| 3,501,581 | 3/1970 | Edwards............................ | 174/15 C |
| 3,539,702 | 11/1970 | Edwards et al.................. | 174/15 BH |
| 3,728,463 | 4/1973 | Kullmann............................. | 174/19 |
| 3,764,726 | 10/1973 | Kohler............................ | 174/DIG. 6 |
| 3,835,239 | 9/1974 | Schmidt et al................. | 174/15 C X |
| 3,849,589 | 11/1974 | Schmidt et al................. | 174/DIG. 6 |

*Primary Examiner*—Arthur T. Grimley
*Attorney, Agent, or Firm*—Kenyon & Kenyon Reilly Carr & Chapin

[57] ABSTRACT

The invention concerns an arrangement for cooling an electric cable which comprises deep-cooled inner and outer conductors at high voltage and zero potential, respectively, and is provided with cable terminations, in which said inner and outer conductors are connected with respective inner and outer ordinary conductors. The invention consists of the provision that separate cooling loops with a common coolant supply unit are associated with the inner and outer ordinary conductors, and that likewise separate cooling loops with a common return and a further common coolant supply unit are associated with the inner and outer conductors. In this arrangement, the heat losses produced can be removed to the coolant supply units with relatively high efficiency.

14 Claims, 1 Drawing Figure

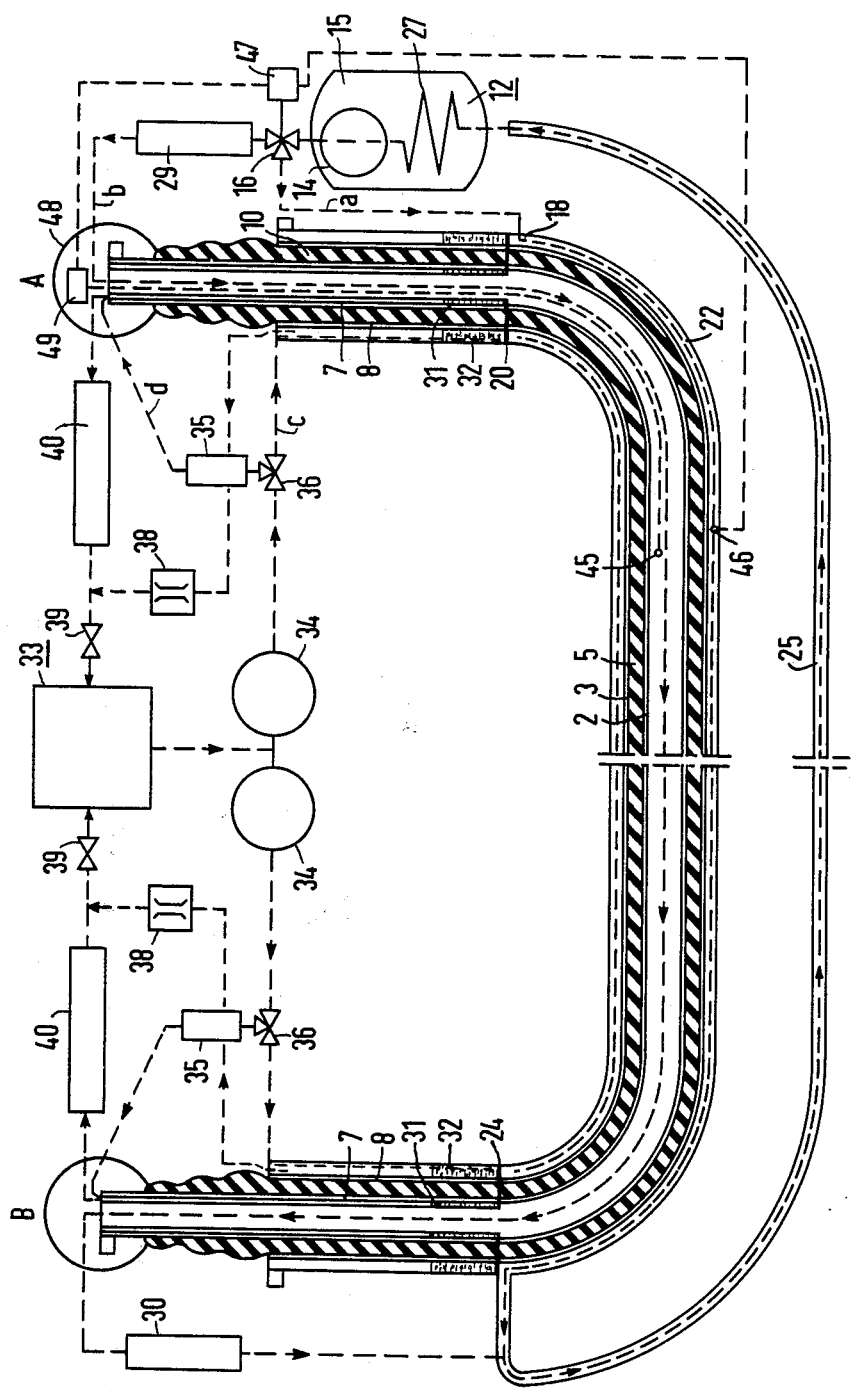

APPARATUS AND METHOD FOR COOLING A SUPERCONDUCTING CABLE

BACKGROUND OF THE INVENTION

1. Field of the Invention

The invention concerns an arrangement for cooling an electric cable which comprises inner and outer conductors at high-voltage and zero potential, respectively, which are arranged concentrically with each other and are cooled to a low temperature, and which is provided at each of its ends with a cable termination, in which said inner and outer conductors are connected with respective inner and outer ordinary conductors which are situated in the gas stream of an evaporating cooling medium.

2. Description of the Prior Art

In order to economically achieve a.c. transmission of large amounts of electric power by means of a cable with conductors cooled to a low temperature, particularly by means of a superconductor cable, high transmission voltages are necessary. The reason for this is mainly that in order to keep the a.c. losses of the superconductors low, the magnetic induction at the conductor surface must not exceed a given flux density, the so-called "critical" flux density. In order to increase the transmitted power further, however, the conductor surface area and therefore, also the conductor diameter in a conductor arrangement with concentric inner and outer conductors must be increased proportionally with the current.

On the other hand, it is necessary to keep the conductor diameter small, because the thermal losses of the deep-cooled conductor arrangement increase with the surface area because of radiation and thermal inflow via the customary mounting and support devices. Also the relatively high cost of the superconductive material of the conductors and the desire to keep the right-of-way for the cable as narrow as possible, lead to small conductor diameters.

The cooling losses of the cable termination required for such cables are essentially determined by the operating current of the cable, which fixes the cross sections of the ordinary conductors to be optimized in the cable terminations due to their Joule losses and thermal inflow from about 300°K to about 4°K. It is therefore desirable to chose, for a given transmission power, the transmission voltage as high as possible, so that the current can be kept as low as possible.

The maximum operating voltage of a cable and its cable terminations connected with it is determined not only by the attainable dielectric strength of the conductor insulation and its dielectric losses, but also by the conditions of the cooling loops required therefor. In a cooling loop for cooling the superconductors of the cable, one must take into consideration that the inner conductor is at high-voltage potential. Because the coolant cools the superconductors advantageously by direct contact, it likewise assumes this potential. When the coolant for the inner conductor is fed-in, the full voltage must therefore be overcome. Similar requirements also apply to the cable terminations. Their inner ordinary conductors, which are at high-voltage potential, which are connected with the superconductors as well as also with a high-voltage supply lead, are cooled by direct contact with the coolant. This insures good heat transfer and favorable heat removal. These cable terminations are therefore each provided with one coolant supply line each and a corresponding coolant discharge line at room temperature, which must be laid out for the full potential gradient.

The temperature range for cooling the superconductors of the cable is relatively small, becuase the a.c. losses increase with temperature and must in general be limited. For niobium, for instance, a cooling range between 4.2° and 6°K must be provided, while for niobium-tin alloy where the a.c. losses are higher, the cooling range may extend from about 4.5° to 10°K. In contrast thereto, the temperature range for cooling the ordinary conductors of the cable terminations is from about 4.2° K to about 300°K, corresponding to the temperature gradient of the ordinary conductors. Such a temperature transition can be provided, for instance, by a bath with boiling helium, whose evaporating helium rises at the ordinary conductors, which may, for instance, be in the form of wires or laminations, and cools the latter. Such a design is known, for instance, from "*The Review of Scientific Instruments*", vol. 38, no.12, Dec. 1967 pages 1776 to 1779.

Because of the differences in temperature ranges and the state and pressure conditions, it is advisable to separate the cooling loops for the cable lines as well as for the cable terminations, in order to obtain an optimum match to the refrigeration machines required in operation. Since, however, good thermal contact exists with the ordinary conductors by means of the leads to the superconductors, it is necessary that these contact points in the cable terminations have the same temperature as the cooling loop for the superconductors of the cable at these points, in order to avoid nonuniformity in the cooling of the superconductor or the ordinary conductors of the cable terminations. Otherwise the cable terminations would be cooled by means of the cooling loop for the superconductors, or vice versa, this cooling loop would be cooled by means of the cable terminations.

It is therefore an object of the invention to provide an arrangement for cooling the cable mentioned at the outset with cable terminations, in which the requirements mentioned are met and which makes economical operation of the cable line possible.

SUMMARY OF THE INVENTION

According to the invention, this objective is met by the provision that the inner and outer ordinary conductors of the cable termination are assigned separate cooling loops which contain a first common coolant supply unit, and that the inner and outer conductor of the cable likewise are assigned separate cooling loops which contain a common return and are provided with a common, second coolant supply unit.

With this embodiment of an arrangement for cooling a cable in accordance with the invention the temperatures of the coolant loops required for the operation of the cable line can advantageously be adjusted in a simple manner so that the heat losses produced can be removed to the coolant supply units with relatively high efficiency.

For this purpose the coolant flow rate in the cooling loops for the inner and outer conductor of the cable can be controllable, as provided in a further embodiment of the arrangement according to the invention, by means of a special coolant branching device, e.g., by means of a three-way valve.

It is also advantageous if the pressure of the cooling medium in the cooling loops for the inner and outer ordinary conductor is controllable, where preferably a control valve can be provided, which is arranged in the common return of these two cooling loops. Thus, temperature control can be accomplished in the cooling baths of the cable terminations by regulating the pressure of the escaping exhaust gas.

BRIEF DESCRIPTION OF THE DRAWING

The drawing shows schematically a longitudinal cross section through a cable line, at each end of which a cable termination is connected.

DESCRIPTION OF THE INVENTION

The cable depicted in the FIGURE comprises two concentric, tubular conductor layers which can serve, for instance, as the outgoing and the return conductor of a phase of a three-phase system and are designated as the inner conductor 2 and the outer conductor 3. The inner and the outer conductor 2 and 3, respectively, consist, for instance, of a multiplicity of individual superconducting wires which are stabilized by means of a ordinary-conducting metal, e.g., copper of aluminum. The superconductive material, for instance, niobium, can be applied to the normal-conducting stabilization metal in the form of a thin film. The arrangement of these individual wires, which lie on a circular circumference side by side in the two conductor layers of the inner and outer conductor 2 and 3, can be constructed so that the overall conductor retains its constant length regardless of temperature changes. A corresponding cable is known for instance, from the U.S. Pat. No. 3,541,221. The inner conductor 2, e.g., the superconducting outgoing conductor of a phase of the three-phase system, is at high-voltage potential. It is concentrically surrounded by the outer conductor 3, the superconducting return conductor, and is electrically separated from the latter by an insulation layer 5.

The cable is provided at each end with a cable termination. These terminations, which are designated with A and B may be, for instance, of identical design. In them, the superconducting inner conductors 2 are connected to the inner ordinary conductors 7, and the superconducting outer conductors 3 to the outer ordinary conductors 8. The inner ordinary conductors 7 are likewise surrounded concentrically by the outer ordinary conductors 8 and are electrically insulted from each other by means of an insulating layer 10.

For cooling, the cable line and its terminations A and B are served by several cooling loops, which are indicated in the drawing by dashed lines. The superconductors of the cable are cooled with single-phase helium, e.g., supercritical helium, which is under a pressure of more than 2.3 atmosphere barometric pressure. The helium is here in a closed cooling loop. It is circulated from the first coolant supply unit 12 which comprises, for instance, a helium pump 14 in a helium tank 15. It is connected to a three-way valve, which advantageously constitutes a controllable coolant branching device 16. By means of this coolant branching device 16 the stream of coolant coming from the coolant supply unit 12 is divided into two partial streams for cooling the outer and the inner conductor 3 and 2, respectively. The helium for the outer conductor 3, which is designated a, enters at an inlet 18 at the junction 20 between the cable termination A and the cable line into a helium-carrying tube 22 surrounding the outer superconductors, flows through this tube to the junction 24 between the second cable terminations B and the cable, and is then returned by means of a return line 25, which may also be connected with a radiation shield surrounding the helium-carrying tube, to a heat exchanger 27 into the helium tank 15 of the coolant supply unit 12. The heat loss absorbed, which is produced by the a.c. losses of the superconductor, the dielectric losses of the insulation 5 between the outer and the inner conductor 2 and 3, by thermal inflow and radiation losses as well as by viscosity losses of the coolant, is delivered by this heat exchanger 27 to the helium bath in the coolant supply unit 12.

The helium for the inner conductor 2, which is designated $b$, at a high voltage because it is in contact with the high voltage inner conductor 2, passes through the coolant branching device 16 to a high-voltage transition element 29, which is well kown in the prior art. The helium then flows through the interior of the first cable termination A and enters the inner conductor 2 at the junction 20 between the termination and the cable. It flows through the interior of the inner conductor 2, enters at the end of it into the second cable termination B, flows through it and gets back to zero potential by means of a second high-voltage transition element 30, which corresponds, for instance, to the element 29. There, it can likewise be fed into the return tube 25 for the helium a of the outer conductor 3 and transported back to the heat exchanger 27. Thus, a closed cooling loop results for both the inner conductor and the outer conductor of the cable. Through this design of the two cooling loops, particularly the high-voltage-resistant insulations 5 and 10 of the cable and the cable terminations A and B are weakened nowhere, as there can be a transition from one into the other without interruption.

If the superconductors of the cable permit a higher operating temperature, the helium tank 15 with the helium pump 14 and the heat exchanger 27 can also be replaced by a refrigerator, which circulates the helium with a starting temperature of about 4.5° to 5°K and more in the gaseous state by means of the cooling loops described above.

The inner ordinary conductor 7 of the cable terminations A and B is at high-voltage potential, while the outer ordinary conductor 8, which surrounds it, is at zero potential. The junction of the superconducting inner conductor 2 of the cable with the inner ordinary conductor 7 is cooled by a helium bath 31 at high potential, and the contact of the superconducting outer conductor 3 of the cable with the outer ordinary conductor 8 is cooled by a helium bath 32 at zero potential. The boiling helium required therefor is delivered to the cable termination A or B, by means of a second coolant supply unit 33, which may be a refrigeration machine, or impressed by a helium pump 34 or compressed gas. The helium loop c, at zero voltage is supplied directly into the cooling bath 32 while the outer helium loop d, for the cooling bath 31, at high-voltage potential, is applied by means of another high-voltage transition element 35. A further coolant branching device 36, which is a three-way valve, serves to divide the two coolant streams c and d. The helium is evaporated in the cooling baths by the conducted and the joule heat and is warmed up to about 300°K, as it cools the ordinary conductors. The gaseous helium of 300°K for the outer ordinary conductor 8 at zero potential is returned by way of a choke point 38, to a controllable valve 39, while the gaseous helium from the high-voltage potential of the inner ordinary conductor 7 also is returned to the valve 39 by means of high-voltage transition element 40. For this further high-voltage transition element 40 for helium gas near room temperature, which in this case has particularly low dielectric strength, two known methods are available. For one, the dielectric strength of the gaseous helium can be increased by admixing an electronegative gas (U.S. Pat. No. 3,835,239); on the other hand, the gaseous helium can also be discharged through capillaries of an electrically insulating material (U.S. Pat. No. 3,849,589). The purpose of controllable valve 39 is to adjust the boiling temperature of the helium in the cooling baths 31 and 32 of the cable termination A and B by adjusting the pressure in such a manner that it corresponds to the input and output temperature of the helium at the respective ends of the cable, which are coupled with the two cable terminations A and B. As for the cable terminations the pressure drop in the line for the gaseous helium which serves at zero potential for cooling the outer ordinary conductor 8, is smaller than the pressure drop in the high voltage resistant discharge from the inner ordinary conductor 7, but the coolant baths 31 and 32 are to be at the same temperature. The choke point 38, which simulates the additional pressure drop in the high-voltage transition element 40, is inserted into the first line. After the controllable valve 39, the gaseous helium is applied to the refrigeration machine of the coolant supply unit 33.

Matching the temperature of the cooling baths 31 and 32 of the cable termination A and B to the corresponding cable temperature is possible only in the range from 4.2° to 5.2°K. In case the temperature at the cable end exceeds 5.2°K, the cable termination B can be cooled with cold helium gas. This applies correspondingly to both cable termination A and B, if the superconductors are already cooled on the feeding side by a refrigerator above 5.2°K. In these cases it may be necessary to heat the cold helium gas to the appropriate temperature of the cable at the input or output, for instance, by inserting an electric heating system into the thermally insulating line between the helium pump 34 ahd the coolant branching device 36.

The helium pressure is determined by the helium pump 14 or the refrigerator. It will normally be adjusted so that the coolant can remove losses, which occur at the operating current of the cable, in the desired temperature range.

The division of the two cooling streams a and b by the three-way valve 16 for the superconducting inner and outer conductor 2 and 3 depends on the design of the cable. In the design shown in the FIGURE, where the helium return line 25 may be equipped with a radiation shield around the helium-carrying tube 22 containing the superconducting outer conductor 3, the thermal losses are intercepted by the helium radiation shield. In the helium-carrying cable, thermal losses are produced by the a.c. losses of the superconductors, the dielectric losses of the conductor insulation between the two conductors, and the viscosity losses of the coolant. As the magnetic induction at the conductor surface is higher in the case of the inner conductor 2 than of the outer conductor 3, somewhat higher a.c. losses are produced on the inside. As the helium of the inner and the outer conductors 2 and 3 is to be returned to the heat exchanger 27 or to the helium tank 15 of the coolant supply unit 12 by way of a common, helium-carrying tube, it is advisable that it have the same temperature at the confluence. This can be insured, for instance, by measuring the temperature of the helium at the inner conductor 2 and the outer conductor 3 by means of temperature sensors 45 and 46, which are, for instance, germanium or carbon resistors, by feeding the measured values to a control 47, only indicated in the FIGURE, with a positioning motor and the three-way valve of the coolant branching device 16 driven by it, which sets the value so that the temperature of the helium is approximately equal after the same conductor length. The corresponding transmission paths are shown in the FIGURE by dashed lines. The necessary temperature measuring points 45 and 46 can advantageously be arranged at such a distance from the cable termination A that an influence by the latter is not expected. They may advantageously also have such a measurement accuracy that the discharge temperature at the second cable termination B can be extrapolated. They should be placed not at large distance from the first cable termination A in order not to let the time constant for the control become too long, which is determined by the travel-time ratio of the distance between the valve and the measuring point of the flow velocity. Also for this reason, it is advantageous to keep the flow rate for all operating currents constant, because otherwise the time constants of the control 47 would have to be made variable according to the flow rate. As this control is relatively sluggish because of the travel times, there would otherwise also be the danger of overheating of the superconductors in the event of short-time flow rate increases. If as a further possible embodiment, a helium return line without radiation shield is provided, thermal losses occur additionally in the helium of the outer conductor 3, and the ratio of the helium flow rates through the inner and outer conductors must be changed accordingly.

In the case where the inner conductor 2 is provided as the outgoing path for the helium and the space around the outer conductor 3 for the return, the described control becomes unnecessary. However, there is the danger in such an arrangement that because of the thermal coupling between the helium of the inner and the outer paths, temperature increases can occur which are above the starting temperature of the helium and therefore lead to higher a.c. losses and poorer utilization of the refrigeration machines.

For measuring the helium temperature of the inner conductor 2, additional measures must be taken, as the temperature sensor 45 is at high-voltage potential. The measured value of this sensor is fed from the measurement point in the interior of the inner conductor 2, which is in a field-free space, for instance, under a static shielding cap 48 of the first cable termination A and is brought there to zero potential via a measuring transducer 49, only indicated in the drawing, by means of an analog-to-digital converter, a laser diode, or a light guide as the insulating element. There, the measured information can be recovered by means of a light-sensitive element and a digital-to-analog converter and fed to the control 47.

Instead of the interposed members laser-light, guide-light sensitive element, a high-frequency oscillator at high voltage and a receiver at zero potential, for instance, can also be used to measure the voltage.

The helium baths 31 and 32 of the cable terminations A and B can be replenished continuously or intermittently. For continous replenishment, it is advisable to provide a tank level indicator which furnishes a continous analog output signal. A lesser expenditure of helium is required by an on-off control with intermittent replenishment, using two level sensors for determining the lower and upper tank level in the cooling bath. The helium pump 34, the speed of which is controlled or which is switched off and on, can then serve as the control element. In the case of compressed gas pumping, a pressure valve can be provided similarly.

To adjust the temperature in the helium baths 31 and 32 of the cable terminations A and B, one can, if the losses of the lead are kown, extrapolate the desired reference value for the first cable termination A, which is obtained by a temperature sensor arranged in the helium feed line between the coolant branching device 16 and the cable input. For the second cable termination B, a second temperature sensor at zero potential of helium stream of the outer conductor 3 can be used, according to the control of the division of the two cooling streams. The respective actual value is obtained, for instance, by the signal transducer of a pressure measuring device, because the dependence of the boiling point of the helium on the pressure is known. The pressure is measured, for instance, immediately ahead of the controllable valve 39 at ground potential, which can be operated by the control by means of a positioning motor.

If cooling with cold gas is used, it is necessary in a similar way that the input temperature of the helium gas into the cable termination A or B at the junction between the superconductor and the ordinary conductor agrees with the corresponding cable temperature. The desired values can be measured for instance, by means of the same measuring points as must be provided for the temperature control of the cooling baths. The actual value can be measured at zero potential directly at the contact point. The value can substitute for the corresponding point at high-voltage potential. For this purpose, a prior measurement and adjustment by the coolant branching device 36 can be made. As the control element for the control of the temperature of the cold helium gas a heater can serve between the helium pump 34 and the cable terminations A or B, which is built into the thermally insulated helium line.

The flow rate of the cold helium gas can be controlled by one or several temperature sensors, which can be placed along the outer ordinary conductor 8 serving as the current input lead, which control the regulating valve 39. These temperature sensors at zero potential can act as substitutes for the high-voltage side.

If the behavior of the two cooling loops of the cable terminations A and B is not identical, then separate exhaust gas circuits with one control valve each corresponding to the control valve 39 must be provided. The temperature of the high-voltage path would then have to be measured also by means of a measuring transducer. In order to obtain faster control, it is advisable to enter the flow rate value of the cable into the control, so that the flow rate can be increased without delay by a thermal time constant, if the flow rate rises.

In the embodiment example, a cable with two cable terminations for superconductors is described, which are cooled with helium. However, corresponding arrangements can be provided for other conductors cooled to a low temperature, for instance aluminum or beryllium, which are cooled with other cooling media, for instance, hydrogen.

Besides the cable terminations for arrangements according to the invention, terminations of different design can also be used. They may be provided, for instance, with special devices which create a potential transition zone for the coolant or cooling medium within the termination and therefore make corresponding high-voltage transition elements in the supply and discharge lines unnecessary, at least in part.

What is claimed is:

1. Apparatus for cooling an electrical cable having concentric inner and outer superconductor conductors, said cable also having an inner channel and an outer channel through which coolant can flow for cooling the inner and outer superconductors, said inner conductor being at a high voltage and said outer conductor being at a zero voltage and wherein said inner and outer superconductors are connected to corresponding inner and outer ordinary conductors at cable terminations at each end of said cable, comprising:
   a. means at each of said terminations for cooling said inner and outer ordinary conductors with the gas stream of an evaporating cooling medium;
   b. a first common coolant supply unit having its output coupled to supply coolant to said means cooling said inner and outer ordinary conductors separately at each termination and including a return means returning used coolant to said first supply unit, said means for cooling said inner and outer ordinary conductors and said return means form ordinary conductors and said return means forming first cooling paths; and
   c. a second common coolant supply unit having its output coupled to one point of the inner and outer channels in said cable, and a common return line coupling another point of said cable, and a common return line coupling another point of said inner and outer channels to the input of said second coolant supply unit, said second coolant supply unit, inner and outer channels and return line forming second cooling paths.

2. The apparatus of claim 1 further comprising, a first coolant branching device in said first cooling path at zero voltage < − > and having two out branches < connected to said first common supply unit >,
   a first high voltage transition element connected between one out branch of said first coolant branching device and said cooling path for said inner ordinary conductor of said cable termination,
   means for connecting the other out branch of said first coolant branching device to said outer ordinary conductor of said cable termination,
   a second coolant branching device connected to said second common supply unit at zero voltage and having two out branches,
   a second high-voltage transition element connected between one out branch of said second coolant branching device and said cooling path for said inner superconductor conductor, and
   means for connecting the other out branch of said second coolant branching device to said cooling path for said outer superconductor conductor.

3. The apparatus of claim 2 further comprising means for controlling said second coolant branching device to control the coolant flow rates in said inner and outer cooling paths for said inner and outer superconductor conductors.

4. The apparatus of claim 3 wherein said second coolant branching device is a three-way valve.

5. The apparatus of claim 4 wherein said means for controlling said three-way valve comprises,
temperature sensors provided in the inner and outer flow channels of said superconductor conductors for generating signals proportional to temperature,
means for converting said signals proportional to temperature to control signals with zero potential bias, and
a positioning motor responsive to said control signals for controlling the flow in said three-way valve.

6. The apparatus of claim 5 wherein said temperature sensors are carbon resistors.

7. The apparatus of claim 5 wherein said temperature sensors are germanium resistors.

8. The apparatus of claim 5 wherein said means for converting signals proportional to temperature to control signals with zero voltage bias is an analog-to-digital converter followed by digital-to-analog converter.

9. The apparatus of claim 5 wherein said means for converting signals proportional to temperature to control signals with zero voltage bias is a high frequency oscillator followed by a receiver.

10. The apparatus of claim 1 further comprising means for controlling the coolant flow rates in the inner and outer conductors of said superconductor conductor.

11. The apparatus of claim 1 wherein the pressure of said gas stream of an evaporating stream medium for cooling inner and outer conductors of said cable terminations is controlled.

12. The apparatus fo claim 11 wherein said pressure of said gas stream is controlled by means of a control valve placed in a common return of said cooling paths for said inner and outer ordinary conductors of said cable termination.

13. The apparatus of claim 1 wherein the coolant for said second cooling paths is helium.

14. The method for cooling concentric inner and outer superconductors having an inner channel and an outer channel in which coolant flows for cooling the inner and outer superconductors, said inner conductor being at high voltage and said outer conductor being at zero voltage wherein said inner and outer superconductor conductors are connected with corresponding inner and outer ordinary conductors of cable terminations at each end of said superconductor conductors and having first cooling points connected to a first common supply unit for cooling said inner and outer ordinary conductor of said cable terminations and having second cooling points connected to a second common supply unit for cooling said inner and outer superconductor conductors comprising,
feeding a first part of the coolant from said second cooling supply unit to the superconductor cable at a junction between the outer superconductor and the outer ordinary conductor of the first cable termination,
discharging the coolant from the outer superconductor conductor after passing it through the cable line, to the junction between the outer conductor and the outer ordinary conductor of the second cable termination,
returning the coolant to a common coolant supply line,
feeding a second part of the coolant to the first cable termination at high voltage by way of a high voltage transition element,
discharging said second part of the coolant from second cable termination,
returning said discharged second part of the coolant by way of a second high voltage transition element to said common coolant supply line,
feeding a part of the cooling medium from said first cooling supply unit to a bath at high voltage in said first and second cable terminations by way of a third high-voltage transition element,
discharging the exhaust gas produced from said bath which cools the inner ordinary conductor of said cable termination by passing it through further high voltage transition elements, one for each cable termination,
returning at zero voltage said discharged exhaust gas to said first coolant supply unit,
feeding the other part of the cooling medium to a further respective bath at zero voltage for each cable termination for cooling the outer conductors of said cable terminations,
discharging the gas produced from said baths cooling said outer conductors, and
returning said discharged gas to said first coolant supply unit.

* * * * *